United States Patent
Chou (10) Patent No.: US 8,284,029 B2
(45) Date of Patent: Oct. 9, 2012

(54) RADIO FREQUENCY IDENTIFICATION SYSTEM AND METHOD

(75) Inventor: Feng-Jian Chou, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 320 days.

(21) Appl. No.: 12/573,222

(22) Filed: Oct. 5, 2009

(65) Prior Publication Data

US 2010/0097188 A1    Apr. 22, 2010

(30) Foreign Application Priority Data

Oct. 17, 2008  (TW) ............................... 97140073 A (51) Int. Cl.
*G06K 7/01* (2006.01)
(52) U.S. Cl. ...................................... 340/10.1
(58) Field of Classification Search ............... 340/10.34, 340/825.34, 10.1, 572.3, 10.4, 10.3, 825.49; 273/274

See application file for complete search history.

(56) References Cited

U.S. PATENT DOCUMENTS 6,150,921 A * 11/2000 Werb et al. ................... 340/10.1
6,194,993 B1 * 2/2001 Hayashi et al. ............ 340/10.34
6,714,121 B1 * 3/2004 Moore .......................... 340/10.3
7,612,675 B2 * 11/2009 Miller et al. ............... 340/572.3
2006/0202422 A1 * 9/2006 Bahar ............................ 273/274

FOREIGN PATENT DOCUMENTS

| CN | 1560788 | 1/2005 |
| CN | 1732487 | 2/2006 |

OTHER PUBLICATIONS

Chinese Patent Office, Office Action 0810384CN, dated May 11, 2011, pp. 1-5.

* cited by examiner

*Primary Examiner* — Jennifer Mehmood
*Assistant Examiner* — Kaleria Knox
(74) *Attorney, Agent, or Firm* — Edell, Shapiro & Finnan, LLC (57) ABSTRACT

An identification system and method is disclosed to identify an identity and a position of a radio frequency (RF) device. The RF device generates a response signal when receiving an RF signal. The identification system includes a plurality of antenna units, a switching unit, an RF module and a microcontroller. Each antenna unit has a corresponding identifying area. The switching unit is coupled to the antenna units. The microcontroller controls the switching unit to select at least one antenna unit for transmitting the RF signal generated by the RF module, and determines whether the RF device positions in the corresponding identifying area of the select antenna unit according to whether the selected antenna unit receives the response signal. The microcontroller also identifies the identity of the RF device when the select antenna unit receives the response signal.

14 Claims, 6 Drawing Sheets

RADIO FREQUENCY IDENTIFICATION SYSTEM AND METHOD

CROSS REFERENCE TO RELATED PATENT APPLICATION

This patent application is based on Taiwan, R.O.C. patent application No. 097140073 filed on Oct. 17, 2008.

FIELD OF THE INVENTION

The present invention relates to radio frequency (RF) technology, and more particularly, to an identification system and method for identifying an identity and a position of an RF device on a surface.

BACKGROUND OF THE INVENTION

Figure 1:
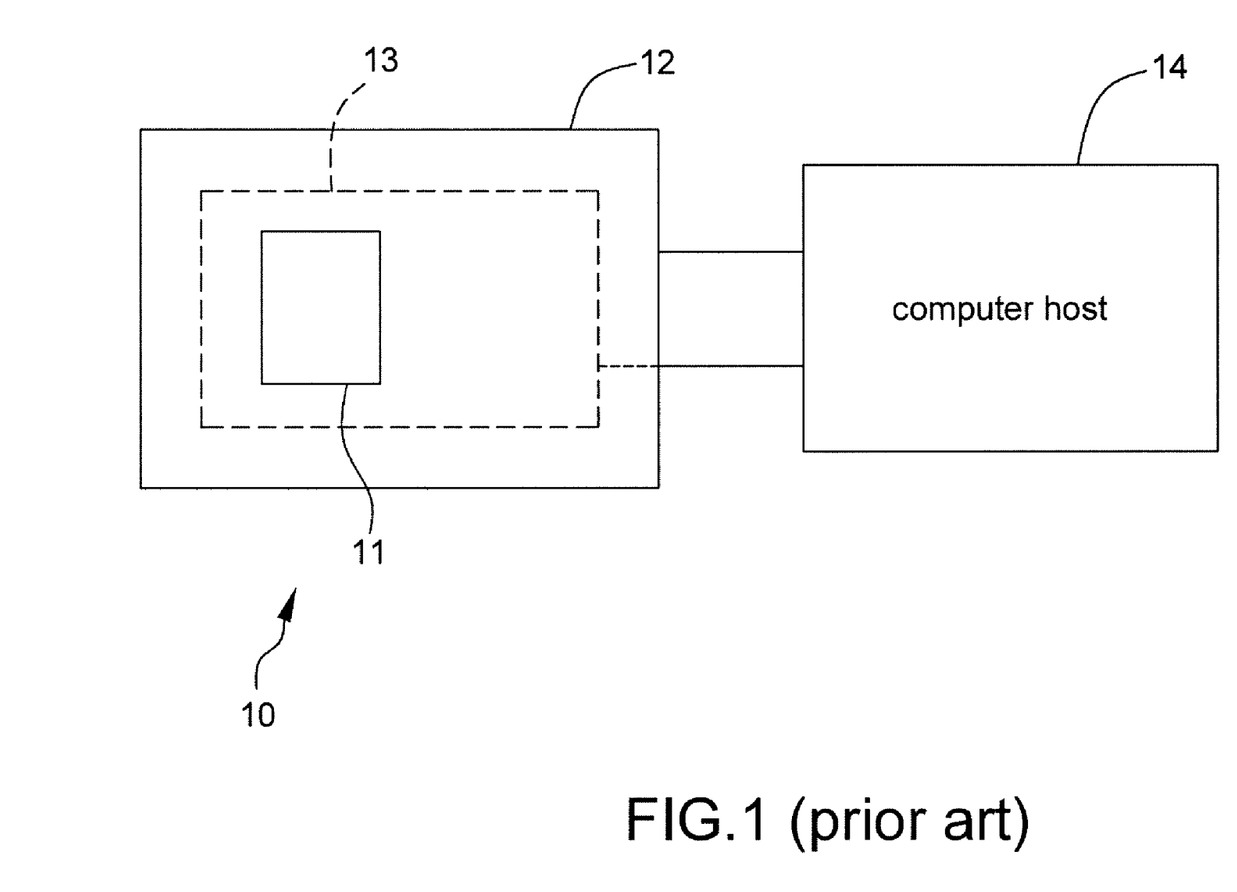
FIG. 1 is a schematic diagram of a surface computer.

Radio frequency (RF) is used extensively in various short-distance wireless communications. Referring to FIG. 1, in a surface computer 10, an RF device 11 such as a cell phone with a radio frequency identification (RFID) tag placed on a display panel 12 communicates with a computer host 14 through an RF module 13, which includes an antenna and an associated RF circuit and is located at the back side of the display panel 12. Note that in this application, the computer host 14 may be more versatile given that the position of the RF device 11 on the display panel 12 is known. For example, via processing and transmission using the computer host 14, pictures saved in the RF device 11 may be displayed around the location of the RF device 11, e.g., on the display panel 12 for the user to view. For another example, when there are two or more RF devices on the display panel 12, the computer host 14 needs to locate the RF devices in order to identify the position of each RF device to proceed with subsequent communications.

SUMMARY OF THE INVENTION

Therefore, it is an object of the present invention to provide an identification system and method capable of identifying an identity and a position of an RF device.

Embodiments of the invention provide an identification system for identifying a position of an RF device, which generates a response signal upon receiving an RF signal. The identification system comprises: a plurality of antenna units, each of which having a corresponding identifying area; a switching unit, coupled to the plurality of antenna units; an RF module, coupled to the switching unit, for generating the RF signal; and a microcontroller, coupled to the switching unit and the RF module, for controlling the switching unit to select at least one antenna unit among the plurality of antenna units to transmit the RF signal, and determining whether the RF device positions in the corresponding identifying area of the select antenna unit according to whether the selected antenna unit receives the response signal.

Embodiments of the invention further provide an identification method for identifying a position of an RF device, which generates a response signal upon receiving an RF signal. The identification method comprises steps of: providing a plurality of antenna units, each of which having a corresponding identifying area; selecting at least one antenna unit among the plurality of antenna units; providing the RF signal and transmitting the same via the selected antenna unit; and determining whether the RF device is in the corresponding identifying area of the selected antenna unit according to whether the selected antenna unit receives the response signal.

Embodiments of the invention still further provide an identification system for identifying an identity and a position of an RF device, which generates a response signal upon receiving an RF signal. The identification system comprises: a panel, divided into a plurality of positioning areas, having a positioning function for determining which positioning area the RF device is in when the RF device is on the panel; a plurality of antenna units, provided on a same side as the panel, wherein each positioning area of the panel has at least one corresponding antenna unit; a switching unit, coupled to the plurality of antenna units; an RF module, coupled to the switching unit, for generating the RF signal; and a microcontroller, coupled to the panel, the switching unit and the RF module, for controlling the switching unit to select, among the antenna units, an antenna unit corresponding to the positioning area which the RF device is in, for controlling the RF module to transmit the RF signal via the selected antenna unit, and for identifying the identity of the RF device upon receiving the response signal via the selected antenna unit.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 2:
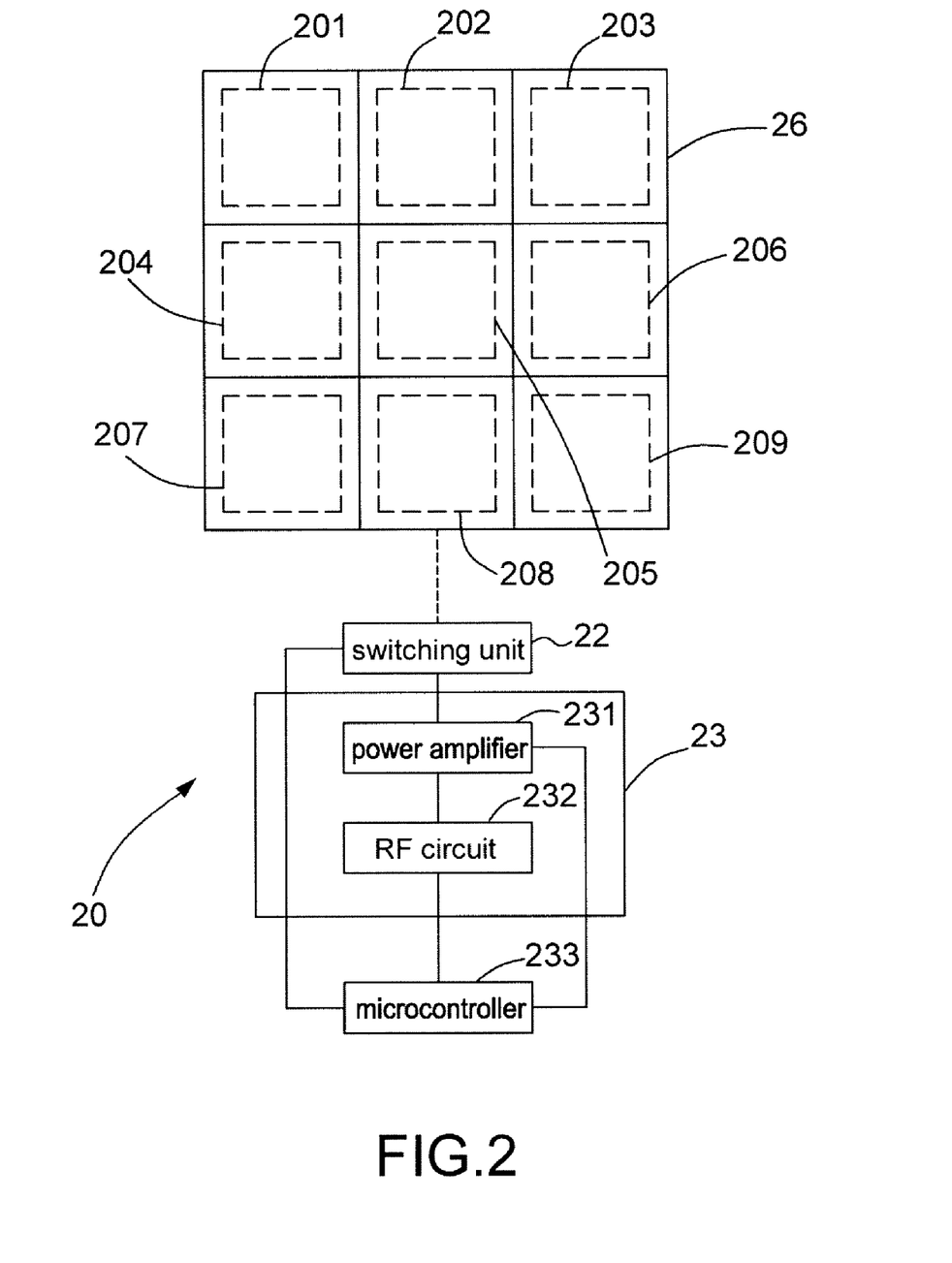
FIG. 2 is a schematic diagram of an identification system according to one embodiment of the invention.

FIG. 2 shows a schematic diagram of an identification system 20 according to one embodiment of the invention. The identification system 20 comprises a plurality of antenna units (nine antenna units 201~209 are shown in the diagram but the number of the antenna units is not limited thereto), a switching unit 22, an RF module 23 and a microcontroller 233. The identification system 20 is capable of identifying an identity and a position of an RF device on a plane 26. The RF device is, for example, an RFID tag, a cell phone or other portable electronic devices having RFID capabilities, such as digital cameras, digital personal assistants (PDAs) and MP3 players. The antenna units 201~209 are provided on a same side as the plane 26; in FIG. 2, the antenna units 201~209 are arranged in a grid array under the plane 26, but the arrangement is not limited thereto. The RF module 23 comprises an RF circuit 232 and a power amplifier 231. The RF circuit 232 is coupled to the microcontroller 233, and the power amplifier 231 is coupled to the microcontroller 233, the RF circuit 232 and the switching unit 22. The microcontroller 233, coupled to the switching unit 22, controls the switching unit 22 to select at least one antenna unit among the antenna units 201~209. Note that the switching unit 22 does not select two adjacent antenna units at the same time to avoid any possible mutual interference resulting from the two performing communication simultaneously. For example, supposing each antenna unit is to be selected once, apart from sequentially switching to one at a time from 201 to 209, the antenna units may also be first switched to 201, 203, 205, 207 and 209, and then to 202, 204, 206 and 208—several antenna units may operate at the same time without interfering one another.

The microcontroller 233 controls the RF circuit 232 to generate an RF signal, which is then amplified by the power amplifier 231 and provided to the switching unit 22. The switching unit 22 forwards the amplified RF signal to the antenna unit selected by the microcontroller 233, followed by transmitting the amplified RF signal. Inductive coupling is applied in detecting whether an RF device is present on the plane 26. More specifically, when an RF device on the plane 26 receives the amplified RF signal, a response signal is generated, received by the antenna unit which previously transmitted the RF signal, and determined by the RF circuit 23 to confirm the presence of the RF device. When the RF device is detected, it means that the RF device is currently in an identifying area of the selected antenna unit. That is, since each antenna unit has a corresponding identifying area on the plane 26 and the identifying areas cover the entire plane 26, the RF identification system 20 is capable of determining which area on the plane 26 the RF device is in according to which antenna(s) detects the RF device (i.e., by receiving the response signal), as well as identifying the identity of the RF device based on content of the of the response signal or information subsequently transmitted by the RF device. Further, it is possible that the identifying areas on the plane overlap with one another. Therefore, when two or more antenna units detect the presence of a same RF device, it is concluded that the RF device is in an intersection area, whereby the position of the RF device on the plane 26 may be even more accurately determined.

Figure 3:
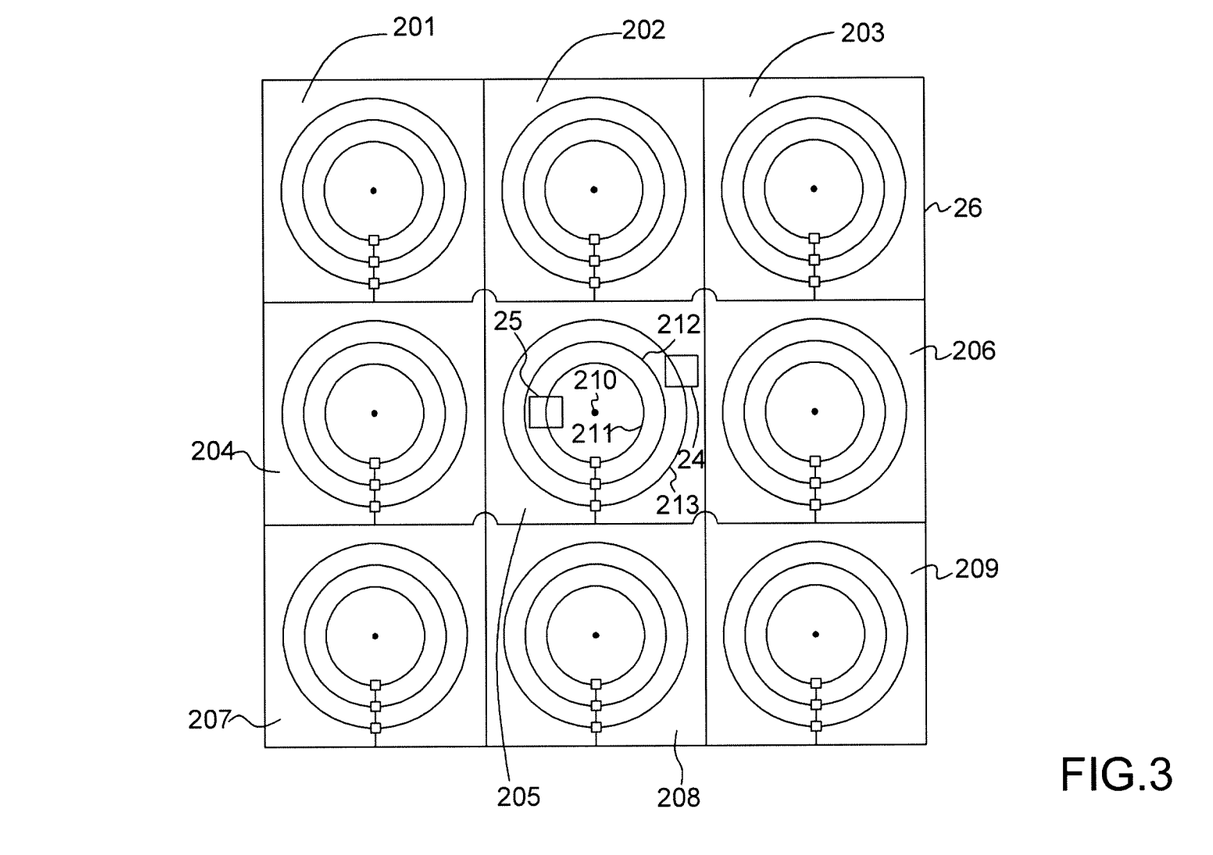
FIG. 3 is a schematic diagram of an identification system according to one preferred embodiment of the invention.

In one preferred embodiment, each antenna unit in FIG. 2 comprises a plurality of ring antennas of different sizes, as shown in FIG. 3. In FIG. 3, each antenna unit comprises three ring antennas 211, 212 and 213 as an example; this is not meant to be a limitation to the number and shape of the antennas constituting the antenna unit. The three ring antennas 211, 212 and 213 are concentric with a center 210. The microcontroller 233 controls the switching unit 22 to select any ring antenna of any antenna unit, and the selected ring antenna then transmits the RF signal generated by the RF module 23 to detect the RF device on the plane 26. When the selected ring antenna receives the response signal generated by the RF signal, the RF circuit 232 then determines and confirms the presence of the RF device. When the RF device is detected, it means that the RF device is located within a detectable range of the selected ring antenna, and a distance between the RF device and the center 210 may be inferred accordingly, e.g., a range of 15 to 25 centimeters from the center 210. For a same antenna unit, the size of the detectable range is dependent on the size of the ring antenna—the detectable range extends farther from the center 210 as the ring antenna gets larger, and approaches nearer to the center 210 as the ring antenna gets smaller. Therefore, a distance between an RF device and a center 210 may be more accurately estimated by determining which of the ring antennas detects the presence of the RF device. However, since the detectable ranges of the ring antennas in difference sizes may overlap with one another, a same RF device on the plane 26 may be detected by two or more ring antennas at the same time. For example, the ring antenna 211 has a detectable range of 0 to 15 centimeters from the center 210, while the ring antenna 212 has a detectable range of 10 to 25 centimeters from the center 210. At this point, the distance between the RF device and the center 210 is estimated according to a detectable range of a smallest ring antenna having detected the RF device. For example, referring to FIG. 3, when an RF device 24 is concurrently detected by the ring antennas 212 and 213, the distance between the RF device and the center 210 is determined by the detectable range of the smaller ring antenna 212; when the RF device 24 is concurrently detected by the ring antennas 211 and 212, the distance between the RF device and the center 210 is determined by the detectable range of the smaller ring antenna 211.

In this preferred embodiment, the microcontroller 233 is capable of controlling the power intensity that the power amplifier 231 uses for amplifying the RF signal. Therefore, for an antenna unit having detected the RF device on the plane 26, the distance between the RF device and the center 210 of the ring antennas, apart from being estimated using the smallest ring antenna of the antenna unit having detected the RF device, may be more accurately estimated further according to a smallest power intensity used by the smallest ring antenna when detecting the RF device. For any ring antenna, as the power of the transmitted RF signal gets larger, the detectable range of the ring antenna extends both outwardly and inwardly from the ring antenna; that is, the detectable range extends both farther from and nearer to the center 210. In this preferred embodiment, this characteristic is used to more accurately estimate the distance between the RF device and center 210. When a smallest ring antenna having detected the RF device is the smallest ring antenna (i.e., the antenna 211) in the antenna unit, the RF identification system 20 determines that the RF device is located either inside or outside of the ring antenna having detected the RF device; when a smallest ring antenna having detected the RF device is other ring antennas (i.e., the ring antennas 212 and 213) of the antenna unit, the RF identification system 20 determines that the RF device is located outside the antenna having detected the RF device. Further, as a result of the smallest ring antenna 211 of the antenna unit being small enough, an RF device located inside the smallest antenna 211 may be detected by the power amplifier 231 using a smallest power intensity. In practice, taking the antenna unit in FIG. 3 for example, the foregoing configuration may be achieved provided that the smallest ring antenna 211 is small enough, and size differences between the ring antennas 211, 212 and 213 are not too large (i.e., the ring antennas are located rather closely to one another). Thus, under such antenna configuration, among the antenna units, for the smallest ring antenna having detected the RF device, the smaller the power intensity capable of detecting the RF device means the nearer the RF device is located to the center 210, and vice versa.

Figure 4:
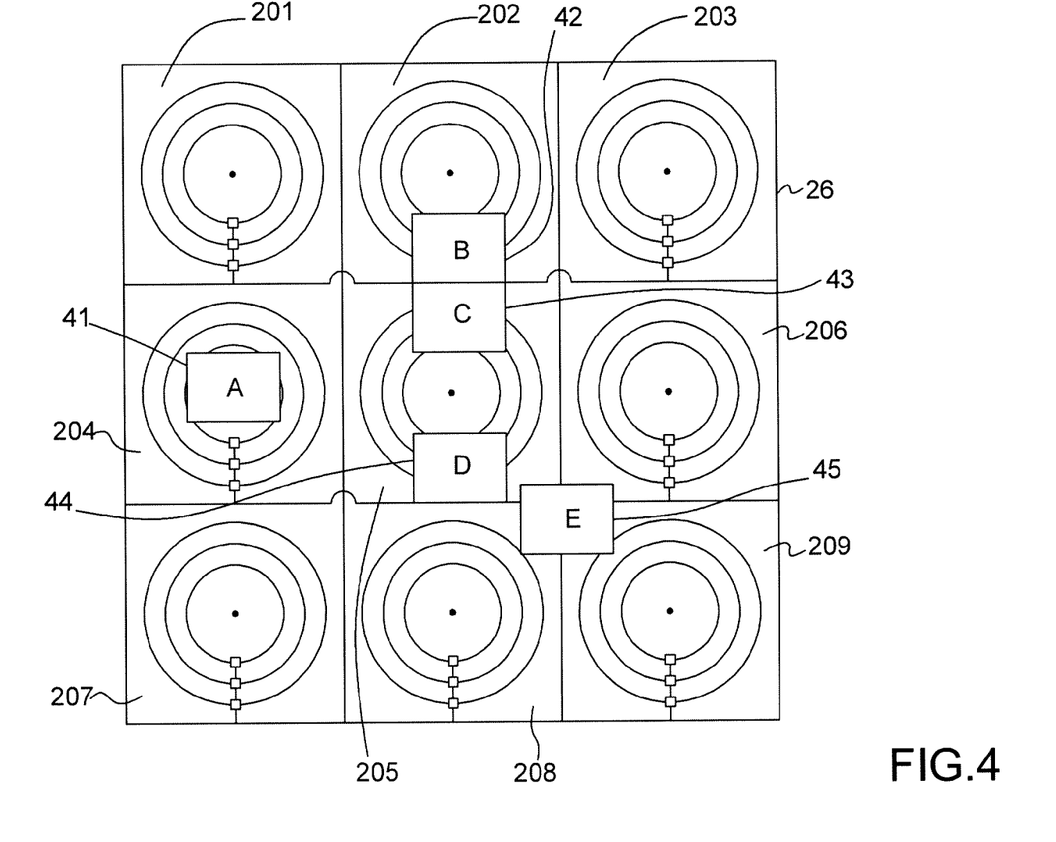
FIG. 4 is an example of implementing the identification system in FIG. 3.

Therefore, according to the preferred embodiment shown in FIG. 3, given that the RF device is detected by at least two antenna units, precise positioning can be achieved using respective distances between the center of the antenna units and the RF device, such that effective identification is promoted when several RF devices are present on the plane 26. For example, in FIG. 4, on the plane 26, there are five RF devices 41~45, having respective identities A~E, to be identified in both identity and position. The RF device 41 is detectable by the antenna unit 204, and a smallest ring antenna having detected the RF device 41 is the smallest ring antenna of the antenna unit 204. Hence, it is determined that the RF device 41, with an identified identity of A, is located in a central area of the antenna unit 204. The RF device 42 and 43 are detectable by the antenna units 202 and 205. By switching between the ring antennas and transmitting power intensity, it is concluded that the RF device 42 is closer to the center of the antenna unit 202 while the RF device 43 is closer to the center of the antenna unit 205. It is also identified that the RF device 42 has an identity of B and the RF device 43 has an identity of C. Further, the RF devices 43 and 44 are concurrently detected by the antenna unit 205, whereby it is obtained that the RF device 43 is also detectable by the antenna unit 202 and the RF device 44 is also detectable by the antenna unit 208. It is then distinguished that the RF device 43 is located in an upper half area of the antenna unit 205 while the RF device 44 is located in a lower half area of the antenna unit 205, with an identity of the RF device 44 identified as D. The RF device 45 is detectable by the antenna units 205, 206, 208 and 209. By detecting and estimating respective distances between the RF device 45 and the antenna units 205, 206, 208 and 209, it is determined that the RF device 45 is approximately located at an intersection of the four antenna units 205, 206, 208 and 209 while being closest of the antenna unit 209, and is identified with an identity of E.

In the embodiments shown in FIGS. 2 and 3, the identification system 20 is capable of identifying a position of an RF device on the plane 26. Thus, supposing the plane 26 is a display panel coupled to the microcontroller 233, the microcontroller 233 may control the display panel to display at least one area with better transmitting/receiving efficiency when the RF device located in an area with inadequate transmitting/receiving efficiency, so as to instruct a user to relocate the RF device to the displayed area to increase communication efficiency. At this point, the RF device is located on the display panel, and each identifying area of each antenna unit is a part of the display panel. Take one preferred embodiment as an example, the identifying areas may cover the entire display panel. Areas with better transmitting/receiving efficiency are dependent on types and shapes of antenna units used. For example, in FIG. 3, for that the antenna units are constituted of ring antennas, areas with better transmitting/receiving efficiency are central areas of the ring antennas. When an RF device is detected by one of the antenna units, and is located rather far from the center of the antenna unit, the microcontroller 233 controls the display panel to display the center of any antenna unit to instruct a user to relocate the RF device to the center of the displayed antenna unit.

In the preferred embodiment, the plane 26 in FIG. 2, such as a touch panel, has a positioning function and is divided into a plurality of positioning areas, each of which having at least one corresponding antenna unit, e.g., one or several antenna units located closer to the positioning area. Thus, the identification system 20 first determines which positioning area on the plane 26 the RF device is in using the positioning function of the plane 26. Then, the antenna unit corresponding to the positioning area is activated to transmit the RF signal to the RF device, and an identity of the RF device can be identified upon receiving the response signal transmitted from the RF device. Thus, using the method above, the identification system 20 is capable of identifying the identity and the position of the RF device on the plane 26.

In another preferred embodiment, the plane 26 may be a touch panel, which is coupled to the microcontroller 233 and provides both positioning and display functions. When the identification system 20 determines that the RF device is located in an area with inadequate transmitting/receiving efficiency, the microcontroller 233 controls the touch panel to display at least one area with better transmitting/receiving efficiency to instruct a user to relocate the RF device to the displayed area in order to increase communication efficiency.

In the foregoing embodiments, the identification system serves as a communication platform between an RF device and a computer host, or between various RF devices. Through the identification process on an identity and a position of an RF device on a plane, besides increasing communication efficiency, various other applications such as the abovementioned surface computer may be developed.

Figure 5:
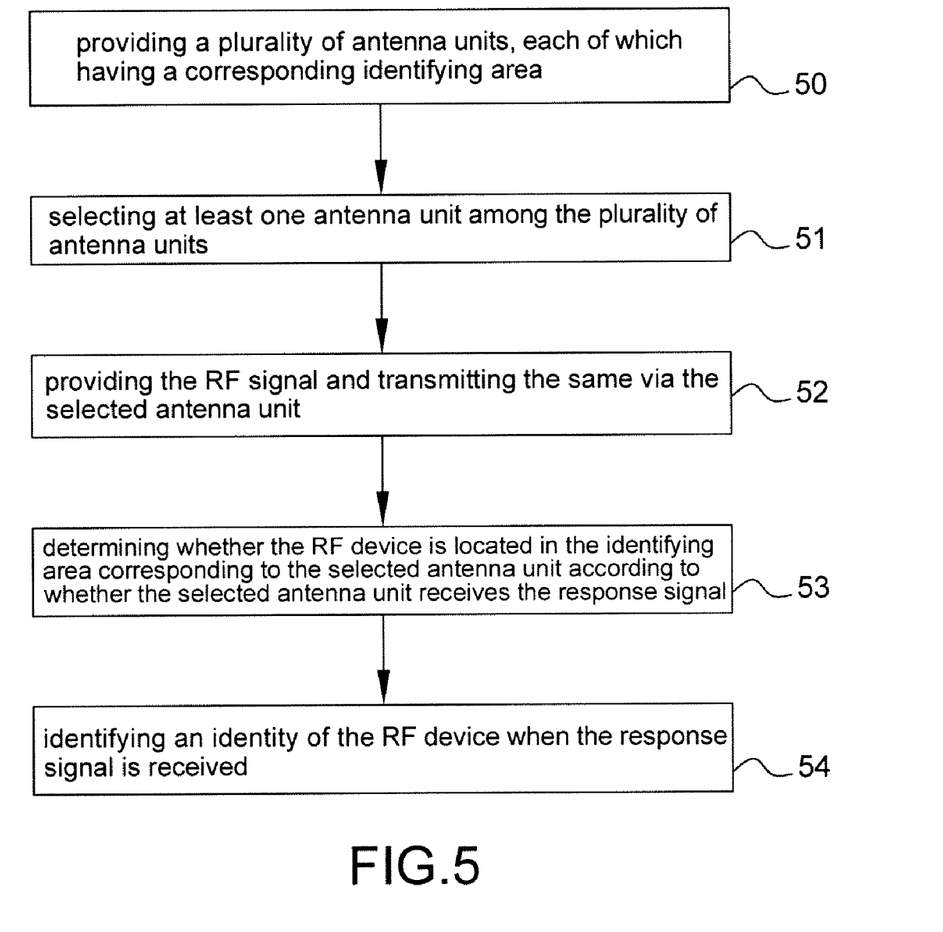
FIG. 5 is a flowchart of an identification method according to one embodiment of the invention.

FIG. 5 shows a flowchart of an identification method for identifying an identity and a position of an RF device on a plane according to one embodiment of the invention, wherein the RF device generates a response signal upon receiving an RF signal. The identification method starts with Step 50 of providing a plurality of antenna units, each of which having a corresponding identifying area. In Step 51, at least one antenna unit among the plurality of antenna unit is selected, followed by providing the RF signal and transmitting the same via the selected antenna unit as in Step 52. In Step 53, according to whether the selected antenna unit receives the response signal, it is determined whether the RF device is located in the identifying area corresponding to the selected antenna unit. In Step 54, when having received the response signal, an identity of the RF device is identified.

In Step 50, the RF device is located on a plane, and the plurality of antenna units are provided on a same side of the plane, such as being arranged in a grid array under the plane 26. In Step 51, two adjacent antenna units are not selected simultaneously.

In one preferred embodiment, the antenna unit selected in Step 51 comprises a plurality of concentric ring antennas having a same center. Step 53 may further comprise a step of, according to a smallest ring antenna having received the response signal and a smallest power intensity of the transmitted RF signal, estimating a distance between the RF device and the center to more accurately position the RF device.

In this preferred embodiment, the RF device is located on a display panel, and the identifying areas corresponding to the antenna units are partial areas of the display panel. The identification method according to this preferred embodiment further comprises a step (not shown) of, when the distance between the RF device and the center indicates that the RF device is not at a central area of the selected antenna unit, controlling the display panel to display the central area of the selected antenna to instruct a user to relocate the RF device to the displayed area to increase transmitting/receiving efficiency of the ring antennas.

Figure 6:
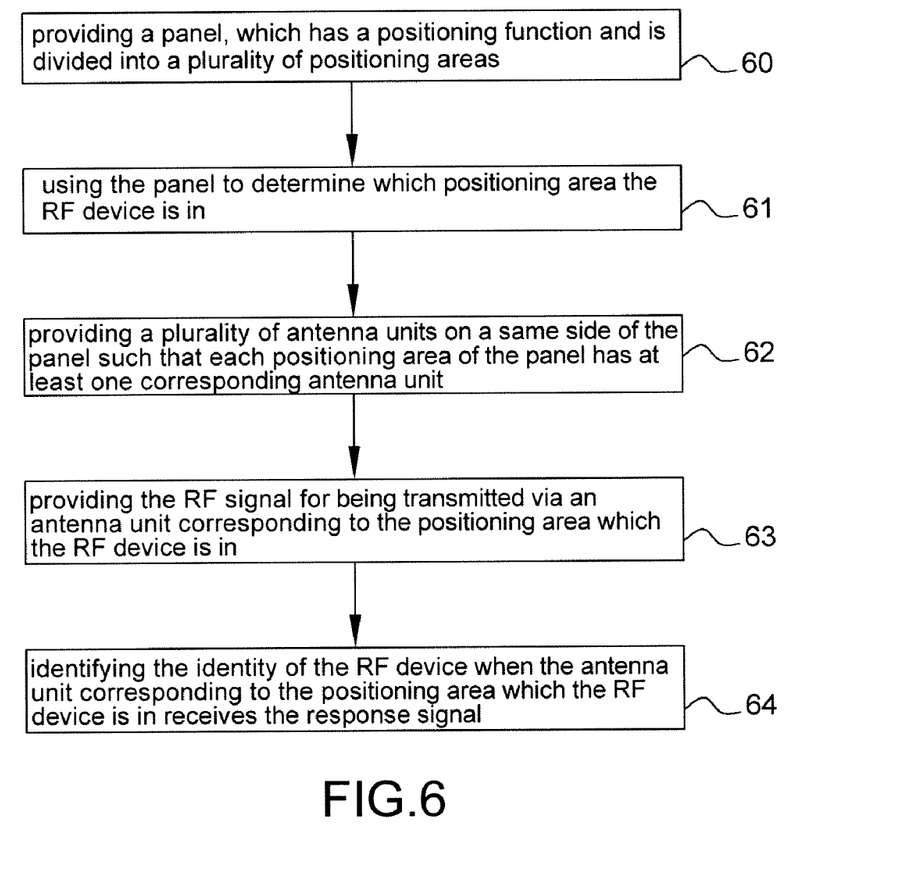
FIG. 6 is a flowchart of an identification method according to another embodiment of the invention.

FIG. 6 shows a flowchart of an identification method for identifying an identity and a position of an RF device according to one embodiment of the invention, wherein the RF device generates a response signal upon receiving an RF signal. The identification method begins with Step 60 of providing a panel, which has a positioning function and is divided into a plurality of positioning areas. In Step 61, using the panel, it is determined which positioning area the RF device is in. In Step 62, a plurality of antenna units are provided on a same side of the panel such that each positioning area of the panel has at least one corresponding antenna unit. In Step 63, the RF signal is provided and transmitted via an antenna unit corresponding to the positioning area which the RF device is in. In Step 64, the identity of the RF device is identified when the antenna unit corresponding to the positioning area which the RF device is in receives the response signal.

Supposing the panel is a touch panel, the identification method further comprises a step (not shown) of, when the positioning area which the RF device is in is not a positioning area with highest transmitting/receiving efficiency, controlling the touch panel to display an area of any antenna unit with a highest transmitting/receiving efficiency to instruct a user to relocate the RF device to the displayed area.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An identification system, for identifying a position of a radio frequency (RF) device on a display, the RF device generating a response signal upon receiving an RF signal, the identification system comprising:
   a plurality of antenna units disposed on a same side of a plane, each antenna unit having a corresponding identifying area;
   a switching unit, coupled to the antenna units;
   an RF module, coupled to the switching unit, for generating the RF signal;
   a microcontroller, coupled to the switching unit and the RF module, for controlling the switching unit to select, as a selected antenna unit, at least one antenna unit among the plurality of antenna units to transmit the RF signal generated by the RF module, and for determining whether the RF device is positioned in an identifying area corresponding to the selected antenna unit according to whether the selected antenna unit receives the response signal; and
   a display disposed parallel to the plane,
   wherein the identification system is configured such that the RF device can be placed on the display,
   wherein images displayed on the display are responsive to the RF device,
   wherein each of the antenna units comprises a plurality of concentric ring antennas of different sizes having a same center, and the microcontroller estimates a distance between the RF device and the center according to a smallest ring antenna in the antenna unit having received the response signal, and
   wherein when it is determined that the RF device is not in a central area of the selected antenna unit, the microcontroller controls the display to display the central area of the selected antenna unit to instruct a user to relocate the RF device to the central area.

2. The identification system as claimed in claim 1, wherein the RF device is a portable electronic device with radio frequency identification (RFID) capabilities.

3. The identification system as claimed in claim 1, wherein the RF module comprises:
   an RF circuit, coupled to the microcontroller, controlled by the microcontroller to generate the RF signal; and
   a power amplifier, coupled to the RF circuit and the switching unit, for amplifying the RF signal and providing the amplified RF signal to the selected antenna unit.

4. The identification system as claimed in claim 3, wherein the microcontroller is coupled to the power amplifier to control power intensity used by the power amplifier for amplifying the RF signal.

5. The identification system as claimed in claim 1, wherein when at least two antenna units among the plurality of antenna units receive the response signal, the microcontroller determines the RF device is in an intersection area of the identifying areas corresponding to the at least two antenna units.

6. The identification system as claimed in claim 1, wherein the microcontroller estimates the distance between the RF device and the center further according to a smallest power intensity of the RF signal transmitted by the smallest ring antenna.

7. An identification method, for identifying a position of an RF device on a display, the RF device generating a response signal upon receiving an RF signal, the identification method comprising steps of:
   selecting, as a selected antenna unit, at least one antenna unit among a plurality of antenna units, each antenna unit having a corresponding identifying area, wherein the antenna units are disposed on a same side of a plane parallel to the display;
   providing the RF signal and transmitting the RF signal via the selected antenna unit;
   determining whether the RF device is positioned in an identifying area, corresponding to the selected antenna according to whether the selected antenna receives the response signal; and
   displaying images on the display responsive to the RF device,
   when it is determined that the RF device is not located in a central area of the selected antenna unit, controlling the display to display the central area of the selected antenna unit to instruct a user to relocate the RF device to the central area.

8. The identification method as claimed in claim 7, wherein the RF device is a portable electronic device with RFID capabilities.

9. The identification method as claimed in claim 7, wherein the selected antenna unit comprises a plurality of concentric ring antennas in different sizes having a same center, and a distance between the RF device and the center is estimated according to a smallest ring antenna in the antenna unit having received the response signal.

10. The identification method as claimed in claim 9, wherein the distance between the RF device and the center is estimated further according to a smallest power intensity of the RF signal transmitted by the smallest ring antenna.

11. An identification system, for identifying an identity and a position of an RF device, the RF device generating a response signal upon receiving an RF signal, the identification system comprising:
   a display panel, divided into a plurality of positioning areas, having a positioning function for determining which positioning area the RF device is in when the RF device is located on the display panel;
   a plurality of antenna units, provided on a same side of the display panel, wherein each positioning area of the display panel has at least a corresponding antenna unit;
   a switching unit, coupled to the antenna units;
   an RF module, coupled to the switching unit, for generating the RF signal; and
   a microcontroller, coupled to the display panel, the switching unit and the RF module, for controlling the switching unit to select, as a selected antenna unit, among the antenna units, an antenna unit corresponding to the positioning area which the RF device is in, for controlling the RF module to transmit the RF signal via the selected antenna unit, and for identifying the identity of the RF device when the selected antenna unit receives the response signal;
   wherein the identification system is configured such that the RF device can be placed on the display panel,
   wherein images displayed on the display panel are responsive to the RF device, and
   wherein the display panel is a touch panel, and when the positioning area which the RF device is not in an area having highest transmitting/receiving efficiency in any antenna unit, the microcontroller controls the display panel to display an area having highest transmitting/receiving efficiency in any antenna unit to instruct a user to relocate the RF device to the displayed area.

12. The identification system as claimed in claim 11, wherein the RF device is a portable electronic device with RFID capabilities.

13. The identification system as claimed in claim 11, wherein the RF module comprises:

an RF circuit, coupled to the microcontroller, controlled by the microcontroller to generate the RF signal; and a power amplifier, coupled to the RF circuit and the switching unit, for amplifying the RF signal and providing the amplified RF signal to the selected antenna unit.

14. The identification system as claimed in claim 13, wherein the microcontroller is coupled to the power amplifier to control a power intensity used by the power amplifier for amplifying the RF signal.

* * * * *